United States Patent
Uchida et al.

(10) Patent No.: US 7,309,853 B2
(45) Date of Patent: Dec. 18, 2007

(54) METHOD FOR CONTROLLING A BIAS VOLTAGE APPLIED TO AN AVALANCHE PHOTODIODE

(75) Inventors: Kenichiro Uchida, Kanagawa (JP); Moriyasu Ichino, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 46 days.

(21) Appl. No.: 11/305,347

(22) Filed: Dec. 19, 2005

(65) Prior Publication Data

US 2006/0157646 A1    Jul. 20, 2006

(30) Foreign Application Priority Data

Dec. 20, 2004    (JP)    ............ P. 2004-368314

(51) Int. Cl.
*G01J 1/44*      (2006.01)
*H01J 40/14*     (2006.01)
*H03F 3/08*      (2006.01)

(52) U.S. Cl. .............. 250/214 R; 250/208.1; 250/214.1

(58) Field of Classification Search ............ 250/208.1, 250/214.1, 214 R, 214 P, 214 D, 214 A, 250/214 LA, 214 LS, 214 VT, 214 PR, 214 SG, 250/214 AG, 214 AL, 214 B, 214 C, 214 DC, 250/214 L, 214 RC, 214 SF, 214 SW
See application file for complete search history.

(56) References Cited

U.S. PATENT DOCUMENTS

| 6,031,219 | A  | * | 2/2000  | Shuke ................ 250/214 R |
| 6,313,459 | B1 | * | 11/2001 | Hoffe et al. ............ 250/214 R |
| 6,707,024 | B2 | * | 3/2004  | Miyamoto et al. ...... 250/214 A |
| 6,852,966 | B1 | * | 2/2005  | Douma et al. ........ 250/214 AG |
| 2002/0020803 | A1 | * | 2/2002 | Suzuki et al. ........... 250/214 A |

FOREIGN PATENT DOCUMENTS

| JP | 08-186924 | 7/1996 |
| JP | 10-303820 | 11/1998 |
| JP | 10-308636 | 11/1998 |

\* cited by examiner

*Primary Examiner*—Georgia Epps
*Assistant Examiner*—Francis M. LeGasse, Jr.
(74) *Attorney, Agent, or Firm*—Smith, Gambrell & Russell, LLP

(57) ABSTRACT

The invention discloses an optical receiver that prevents the instability of the bias voltage to the avalanche photodiode (APD) and facilitates the recovery of the bias voltage from the safety value. The optical receiver comprises the APD, the DC-DC converter to supply the bias voltage to the APD, the current detector to detect the photo current generated by the APD, and the controller to set the bias voltage. The controller, evaluating the optical input power based on the output voltage of the DC-DC converter and the monitored current, sets the output voltage based on the change of the optical input power.

2 Claims, 5 Drawing Sheets

METHOD FOR CONTROLLING A BIAS VOLTAGE APPLIED TO AN AVALANCHE PHOTODIODE

BACKGROUND OF THE INVENTION

1. Field of the Invention

The present invention relates to an optical receiver that installs an avalanche photodiode (hereinafter denoted as APD) with a controller for a bias voltage applied thereto in order to follow the optical input power provided to the APD.

2. Related Prior Art

The APD has been well known as a light-receiving device in an optical communication system. A system installing the APD provides a protection circuit to prevent an excess current from flowing in the APD by adjusting a bias voltage applied thereto when a large optical power is input into the APD. JP-A-10-308636, JP-A-08-186924, and JP-A-10-303820 have disclosed such protection circuits.

The first patent, JP-A-10-308636, has disclosed that the optical receiver monitors the current flowing in the APD, and the bias voltage applied to the APD is adjusted based on thus monitored current. But, once the bias voltage is decreased, the optical receiver is unable to detect the recovery of the optical input because the carrier multiplication factor of the APD strongly depends on the bias voltage. Accordingly, the bias voltage may not automatically recover its normal value.

The second patent, JP-A-08-186924, detects an anomaly of the bias voltage applied to the APD by a comparator and shuts off the bias voltage. This optical receiver does not install any monitoring function of the optical input power. The recovery of the bias voltage is necessary in manual.

The last patent, JP-A-10-303820, has disclosed that, by monitoring the optical input power with a PIN-PD prepared independent from the APD, the bias voltage to the APD is controlled based on the optical power monitored by the PIN-PD. However, such configuration to monitor the optical input power with the PIN-PD requires additional components such as an optical coupler and the PIN-PD, which makes the optical receiver complex and accordingly uncompetitive in cost.

SUMMARY OF THE INVENTION

Therefore, the present invention is to provide an optical receiver that recovers the bias voltage from an extraordinary state with a simple means.

One aspect of the present invention relates to an optical receiver that includes an avalanche photodiode (APD), a power supply, a current detector, and a controller. The APD, by receiving an input signal with an input optical power, generates a photo current corresponding to the input optical power. The power supply supplies a bias voltage to the APD. The current detector detects the photo current generated by the APD. The controller evaluates the current input optical power based on the detected photo current and the bias voltage currently applied to the APD, and adjusts the bias voltage based on the difference of the optical input power between a value currently calculated and that previously calculated and stored in the controller.

The calculation of the current optical input power and the adjustment of the bias voltage is carrier out in periodic. Respective calculated optical input power and the bias voltage are stored in the controller to be used in the subsequent calculation and the adjustment.

In the adjustment of the bias voltage, the controller may compare the calculated optical input power with a preset value, and, when the former is less than the latter, the bias voltage is unvaried. However, when the former becomes greater than the latter, the controller adjusts the bias voltage so as to decrease it from the current bias voltage by a difference between the current optical input power and the former optical input power multiplied by a constant. Therefore, the APD may be prevented from causing an excess photo current at large optical input power. Moreover, the bias voltage applied to the APD may automatically recover the ordinal value because the controller periodically monitors the photo current and calculates the optical input power.

Another aspect of the present invention relates to a method for controlling the APD, specifically, for controlling a bias voltage applied to the APD. The method comprising steps of: (a) detecting the photo current generated by the APD, (b) estimating the optical input power based on the detected photo current and the bias voltage currently applied to the APD, (c) adjusting the bias voltage based on thus estimated optical input power, and (d) iterating the steps from (a) to (c) with a preset interval.

The estimation of the optical input power may be carried out by using the detected photo current and the bias voltage adjusted in the last iteration. Moreover, the step for adjusting the bias voltage may include (c-1) comparing the estimated optical input power with a preset power, and (c-2) calculating a revised bias voltage, when the estimated optical input power exceeds the preset power by the comparison, based on a difference between the estimated optical input power and the optical input power in the last iteration, namely, a change in the optical input power. The revised bias voltage may be changed from the bias voltage in the last iteration by the change of the optical input power multiplied by a constant.

Therefore, according to the present method for controlling the bias voltage to the APD, the APD may be prevented from causing an excess photo current at large optical input power. Moreover, the bias voltage applied to the APD may automatically recover the ordinal value because the controller periodically monitors the photocurrent and calculates the optical input power.

DESCRIPTION OF PREFERRED EMBODIMENTS

Next, preferred embodiments of the present invention will be described as referring to accompanying drawings. In the explanation of drawings, same numerals or symbols will refer the same element without overlapping explanations.

Figure 1:
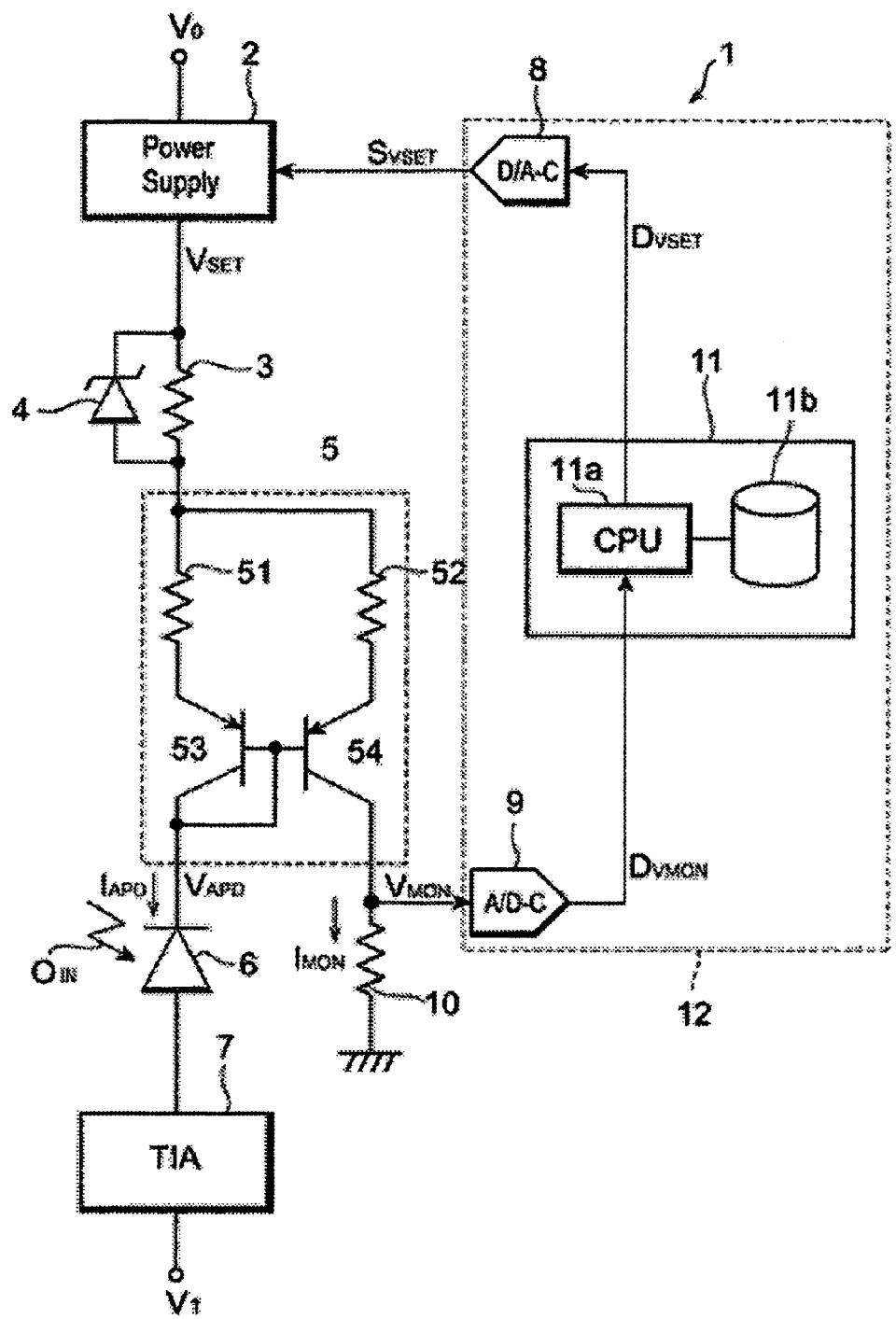
FIG. 1 is a block diagram of the optical receiver according to the present invention.

FIG. 1 is a circuit diagram showing an optical receiver according to the present invention. The optical receiver 1 includes a Power supply 2, a resistor 3, a Zener diode 4, a current-mirror circuit 5 and a reference resistor 10 as a current detector, an avalanche photodiode (hereinafter denoted as APD) 6, a trans-impedance amplifier (hereinafter denoted as TIA) 7, and an analog-to-digital converter (denoted as A/D-C) 9, a controller 11, and a digital-to-analog converter (denoted as D/A-C) 8. The last three components, the A/D-C 9, the controller 11, and the D/A-C 8 operate as a voltage controller 12 for adjusting an output voltage of the power supply 2.

The Power supply 2 outputs a voltage $V_{SET}$ by adjusting an external DC voltage $V_0$. This Power supply 2 supplies the bias voltage $V_{APD}$ to the APD 6 through the resistor 3, the Zener diode 4, and the current mirror circuit 5. Further, the Power supply 2, by receiving the control signal $S_{VSET}$ from the D/A-C 8, sets the output voltage $V_{SET}$ based on thus supplied signal $S_{VSET}$.

The resistor 3, inserted between the Power supply 2 and the current mirror circuit 5, drops the output voltage $V_{SET}$ of the power supply 2. This resistor 3 provides the Zener diode 4 connected in parallel thereto. The Zener diode 4 cramps the voltage generated between two terminals of the resistor 3 by the current flowing therein and shunts this current. This circuit of the resistor 3 and Zener diode 4 connected in parallel to each other drops the bias voltage $V_{APD}$ supplied to the APD 6 in accordance with the current generated by the APD 6, and, at the same same time, prevents the bias voltage $V_{APD}$ from falling below an preset value, which is approximately equal to $V_{SET}-V_Z$, where $V_Z$ is a Zener voltage of the diode 4, even when the current of the APD 6 extremely increases.

The resistor 3 and the Zener diode 4 are connected to the current mirror circuit 5. The current mirror circuit 5 operates such that the current flowing in one of transistors 53, which is equal to the current $I_{APD}$ generated in the APD, is kept proportional to the current $I_{MON}$ flowing in the other transistor 54. That is, when two pnp-transistors, 53 and 54, have substantially same sizes in the collector, the base, and the emitter thereof, and, because bases of them are connected to each other, the bias conditions of transistors, 53 and 54, become equal. Therefore, setting the resistance of resistors, 51 and 52, equal to each other, the currents flowing in each transistor, i.e., the current coming in the emitter and going out from the collector thereof, become equal to each other. When the resistance of the resistor is set by half to the other, for example, the resistance of the resistor 51 is set to be double to that of the other 52, the current flowing in the transistor 54 becomes double to that flowing in the transistor 53.

One output from the current mirror circuit 5 is connected to the cathode of the APD 6. The APD 6 generates a photo current $I_{APD}$ following an optical input $O_{IN}$ incident on the optical receiver 1. The APD 6 is biased by the voltage $V_{APD}$ supplied from the Power supply 2. This bias voltage $V_{APD}$ becomes a value of the output $V_{SET}$ of the Power supply 2 subtracted by the voltage drop at the parallel circuit of the resistor 3 and the Zener diode 4 and the current mirror circuit 5.

The anode of the APD 6 connects the TIA 7, which converts the photo current $I_{APD}$ into a corresponding voltage signal $V_1$ with a predetermined conversion ratio. The TIA 7, when the optical signal $O_{IN}$ is modulated in accordance with a data to be transmitted, outputs the signal $V_1$ modulated accordingly.

The current mirror circuit 5 in another output thereof connects the reference resistor 10 which is grounded in the other terminal thereof. The resistor 10 generates a reference voltage based on the current $I_{MON}$ flowing in the transistor 54 within the current mirror circuit 5, which reflects the photo current $I_{APD}$. Accordingly, the photo current $I_{APD}$ generated by the APD 6 may be detected as the voltage signal $V_{MON}$ generated in the resistor 10 by the co-operation of the current mirror circuit 5 with the reference resistor 10.

The voltage signal $V_{MON}$ is detected by the A/D-C 9, which converts the monitored voltage signal $V_{MON}$ into a corresponding digital value $D_{VMON}$.

Figures 2, 3:
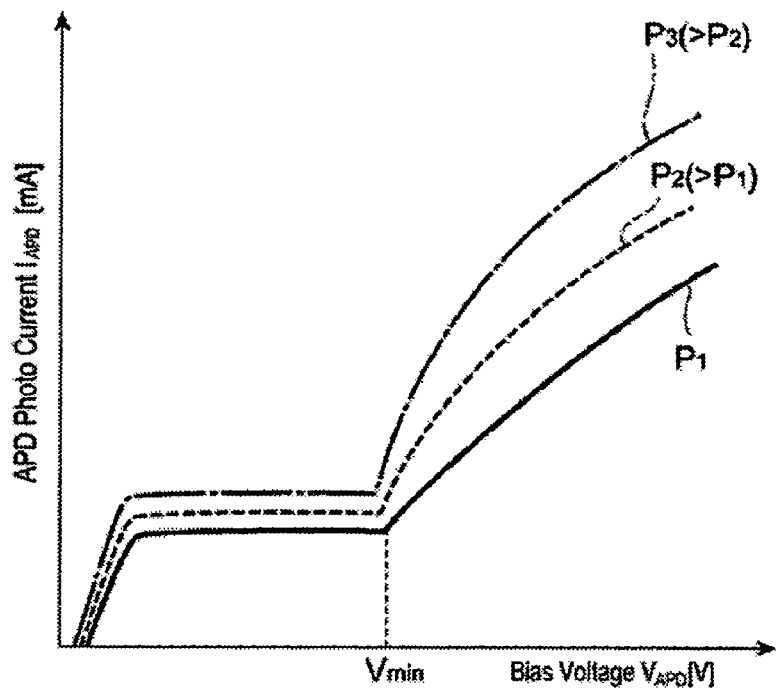
FIG. 2 shows a relation between the output voltage of the DC-DC converter and the photo current of the APD.
FIG. 3 is an example of the schema of the LUT stored in the memory.

The controller 11 may adjust the photo current $I_{APD}$ of the APD 6 with a constant interval by controlling the output voltage $V_{SET}$ of the Power supply 2. FIG. 2 shows a relation between the bias voltage $V_{APD}$ and the photo current $I_{APD}$ of the APD 6 under the constant optical input power. Here, the bias voltage $V_{APD}$ is approximately equal to the output voltage of the power supply 2. As shown in FIG. 2, when the optical input power $O_{IN}$ is constant, the APD 6 generates substantially no photo current until the bias voltage $V_{APD}$ becomes a first value, and exceeding the first value, the current $I_{APD}$ drastically and steeply increases. In the bias voltage $V_{APD}$ between this first value and a second preset value, $V_{MIN}$, the photo current $I_{APD}$ is kept substantially constant. In this region between the first value and the second preset value $V_{MIN}$, the APD 6 operates as a general photodiode without the carrier multiplication function. Further increasing the bias voltage $V_{APD}$ over $V_{MIN}$, the photo current $I_{APD}$ rapidly increases again. In the region $V_{APD}>V_{MIN}$, the APD 6 reveals the carrier multiplication function, namely, operates as an avalanche photodiode. Moreover, in whole range of the bias voltage $V_{APD}$, the photo current $I_{APD}$ increases as the optical input $O_{IN}$ increases in its power $P_N$ (N=1~3).

Next, the operation of the controller 11 will be further described.

The controller 11, in addition to the central processing unit (dented as CPU) 11a, provides a memory 11b. The CPU 11a connects the D/A-C 8 and the A/D-C 9. The controller 11 evaluates the optical power $P_O$ of the signal light $O_{IN}$ and the output voltage $V_{SET}$ for the power supply 2.

The CPU 11a receives the digital value $D_{VMON}$ corresponding to the monitored current $I_{MON}$ from the A/D-C 9. By dividing this value $D_{VMON}$ by the resistance of the resistor 10, the practical value of the monitored current $I_{MON}$ may be obtained. As explained before, the monitored current $I_{MON}$ reflects the photo current $I_{APD}$ by the current mirror circuit 5 and becomes equal thereto when the resistors, 51 and 52, are equal to each other.

Moreover, the CPU 11a calculates the optical power $P_O$ based on the thus obtained current $I_{MON}$ and the output voltage $V_{SET}$ of the Power supply 2 in the last occasion. For the last output voltage $V_{SET}$, it is stored in the memory 11b after the last calculation by the CPU 11a. The CPU 11a refers to a look-up table (denotes as LUT) stored in the memory 11b to evaluate the present optical power $P_O$. FIG. 3 schematically shows a configuration of the LUT in the memory 11b. As shown in FIG. 3, the LUT has data arranged in a matrix form by the current $I_{MON}$ in columns and the control data $D_{VSET}$ for the output voltage $V_{SET}$ in rows. Each data of the optical power $P_O$ corresponds to the current $I_{MON}$ and the voltage $V_{SET}$. For example, an optical power $P_{11}$ [dBm] is arranged for the current $I_{MON}=I_{01}$ [mA] and the voltage $V_{SET}=D_{VSET1}$ [V]. The CPU 11a, based on the calculated current $I_{MON}$ and the control data $D_{VSET}$ for the output voltage $V_{SET}$ in the last occasion, estimates the present optical power $P_O$ at the address corresponding to the $I_{MON}$ in the row and the $D_{VSET}$ in the column.

The configuration of the LUT is not restricted to that shown in FIG. 3. Another arrangement, such as the optical power $P_O$ in rows, while the output voltage $V_{SET}$ in columns, maybe applicable to estimate the present optical power $P_O$.

The CPU 11a calculates the output voltage $V_{SET}^{(0)}$ to be set to the Power supply 2, practically the control data $D_{VSET}^{(0)}$ provided to the powers supply 2 from the D/A-C 8, from the present optical power $P_O^{(0)}$ thus estimated, the last output voltage $V_{SET}^{(-1)}$, and the last optical power $P_O^{(-1)}$. Here, for the last output voltage $V_{SET}^{(-1)}$ and the last optical power $P_O^{(-1)}$, restrictive values stored in the memory are used.

Specifically, the CPU 11a sets the present output voltage $V_{SET}^{(0)}$ to be the predetermined value $V_{SET}^{(0)}$ [V] when the present optical power $P_O^{(0)}$ [dBm] is less than the preset optical power $P_{MAX}$ [dBm]. On the other hand, when the present optical power $P_O^{(0)}$ [dBm] exceeds the preset optical power $P_{MAX}$, the CPU 11a calculates the present output voltage $V_{SET}^{(0)}$ as follows:

$$V_{SET}^{(0)} = V_{SET}^{(-1)} + \alpha(P_O^{(-1)} - P_O^{(0)}) \; [V],$$

where $\alpha$ (>0) is a constant. The CPU 11a, when $P_O^{(0)}$ is greater than $P_{MAX}$, calculates the present output voltage $V_{SET}^{(0)}$ such that it varies from the last output voltage $V_{SET}^{(-1)}$ by a difference between the present optical power $P_O^{(0)}$ and the last optical power $P_O^{(-1)}$ multiplied by the constant $\alpha$. This difference $(P_O^{(-1)} - P_O^{(0)})$ shows the power difference of signal light $O_{IN}$. The CPU 11a sends the present output voltage $V_{SET}^{(0)}$ to the D/A-C 8 in the form of the control data $D_{VSET}^{(0)}$.

Moreover, the CPU 11a stores the present output voltage $V_{SET}^{(0)}$ and the present optical power $P_O^{(0)}$ in the memory as the last output voltage $V_{SET}^{(-1)}$ and the last optical power $P_O^{(-1)}$, respectively, to be used in the next occasion.

Figure 4:
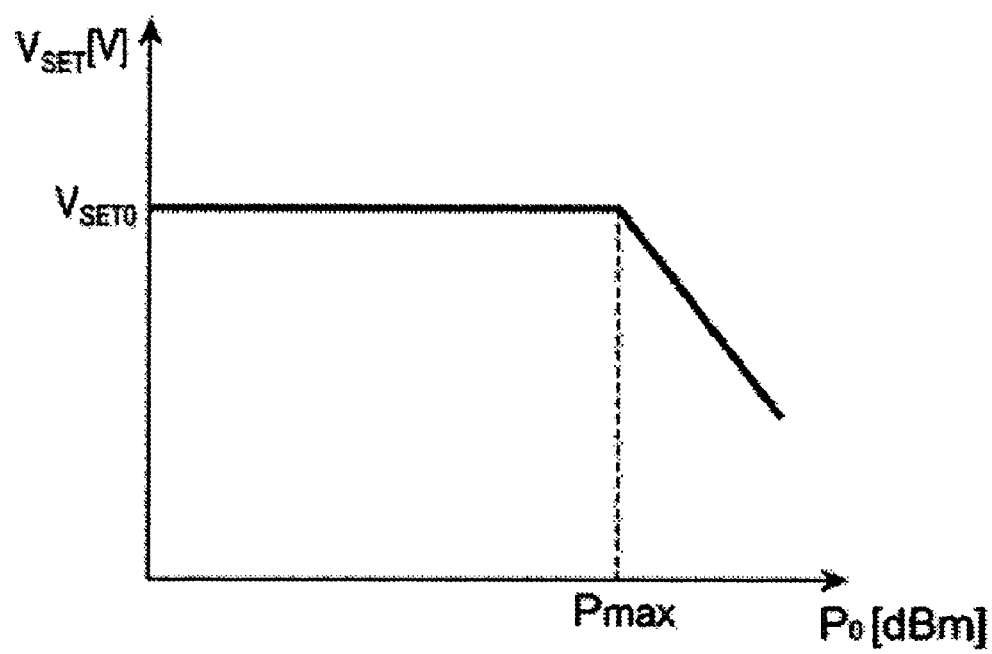
FIG. 4 shows a relation between the output voltage of the DC-DC converter and the optical input power.

FIG. 4 illustrates a relation between the output voltage $V_{SET}$ calculated by the CPU 11a and the optical power $P_O$. As illustrated in the figure, the output voltage $V_{SET}$ is kept constant to be $V_{SET0}$ when the optical power $P_O$ is less than a value $P_{MAX}$ [dBm], while, in the region greater than the value $P_{MAX}$, the output voltage $V_{SET}$ decreases by the slope $\alpha$.

The D/A-C 8, connected to the power supply 2, sends a control signal $S_{VSET}^{(0)}$ to set the output voltage of the power supply to be $V_{SET}^{(0)}$. Thus, when the optical power $P_O$ is less than the value $P_{MAX}$ [dBm], the bias voltage to the APD 6 may be substantially constant, while, the optical power $P_O$ becomes greater than the value $P_{MAX}$ [dBm], the bias voltage decreases by the constant ratio $\alpha$.

Figure 5:
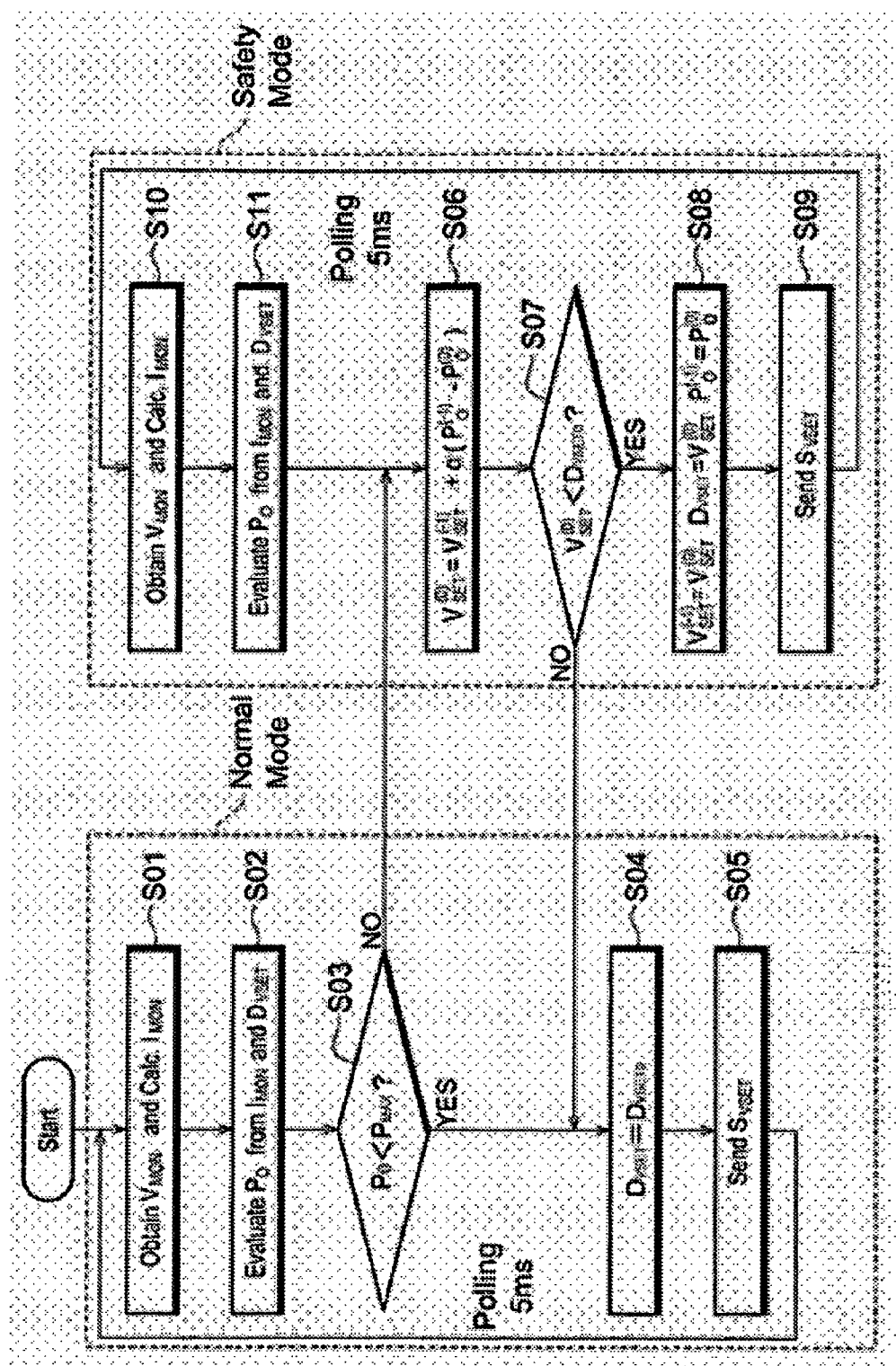
FIG. 5 is a flow chart showing the algorithm to generate the control voltage by the controller.

Next, an algorithm to adjust the bias voltage to the APD 6 by the controller 11 will be described as referring to FIG. 5, which shows the flow chart of the control algorithm.

First, the CPU 11a obtains the monitored voltage $V_{MON}$ generated by the resistor 10 via the A/D-C 9, and calculates the photo current $I_{MON}$ at step S01. Next, at step S02, by referring to the LUT in the memory 11b, the CPU 11a evaluates the optical power $P_O$ based on the last output voltage $V_{SET}^{(-1)}$ of the power supply and the present current $I_{MON}$.

Subsequently, the CPU 11a decides whether the optical power $P_O$ is less than the preset value $P_{MAX}$ or not at step S03. When the optical power $P_O$ is less then the value $P_{MAX}$, denoted as "YES" in FIG. 3, the CPU 11a sends the control signal $S_{VSET}$ corresponding to the output voltage of $V_{SET0}$ through the D/A-C 8, at steps S04 and S05. The CPU 11a, after completing the step S05, executes the processes from step S01 with a preset interval, for example 5 ms. Procedures from steps S01 to S05 are called as a normal mode.

On the other hand, when the optical power $P_O$ is greater than the value $P_{MAX}$ by the decision at step S03, which corresponds to "NO" in the figure, the CPU 11a changes its mode from the normal to the safety mode. That is, the CPU 11a calculates the revised output voltage $V_{SET}^{(0)}$ based on the last output voltage $V_{SET}^{(-1)}$ and the last optical power $P_O^{(-1)}$ at step S06. Further, the CPU 11a decides whether thus calculated output voltage $V_{SET}^{(0)}$ is less than a threshold value $V_{SET0}$, that is, the optical power $P_O^{(0)}$ exceeds the preset value $P_{MAX}$ or not, at step S07. When the optical power $P_O^{(0)}$ is over the preset value $P_{MAX}$, which corresponds to "YES" at step S07, the CPU 11a stores respective values of $V_{SET}^{(-1)}$, and $P_O^{(-1)}$ into the memory 11b after revising them at step S08. Further, by sending the revised control signal $S_{VSET}$ corresponding to the output voltage via the D/A-C 8, the CPU 11a adjusts the output voltage $V_{SET}$ of the power supply 2 to the value $V_{SET}^{(0)}$ at step S09.

The CPU 11a, after completing the procedure of step S09, changes its process to step S10 with a preset interval, for instance 5 ms, and obtaining the current $I_{MON}$ and evaluating the optical power $P_O$ similar to steps S01 and S02, returns the step S06.

On the other hand, when the decision at step S07 is that the optical power $P_O$ is less than the value $P_{MAX}$, which corresponds to "NO" at step S07, the CPU 11a recovers its process in step S04 to change the mode from the safety to the normal.

In summary, the function of the present invention are as follows:

In the optical receiver 1 according to the present invention, the present optical input power $P_O^{(0)}$ is evaluated from the photo current $I_{MON}$ generated by the APD 6 and monitored via the current mirror circuit 5 and the present output voltage $V_{SET}$ of the power supply 2 to be applied to the APD 6 as the bias voltage $V_{APD}$. Moreover, the variation in the optical power $P_O$ may be monitored with a preset interval and the output voltage $V_{SET}$ of the power supply 2 may be varied as the change of the optical power $P_O$. Therefore, even the bias voltage is decreased as the optical input power increases, the optical receiver may detect a situation when the optical input power recovers and becomes below the preset value, and the receiver can recover the bias voltage to the APD.

The controller 11 according to the present invention operates in the normal mode to maintain the output voltage of $V_{SET0}$ when the optical power $P_O$ is less than the value $P_{MAX}$, while, operates in the safety mode to decrease the output voltage $V_{SET}$ of the power supply 2 depending on the optical power $P_O$ when the optical power becomes greater than the preset value $P_{MAX}$. In this case, since the bias voltage $V_{APD}$ for the APD 6 decreases as the input optical power exceeds the value $P_{MAX}$, the APD 6 is protected from breaking down by the self current $I_{APD}$.

Figure 6:
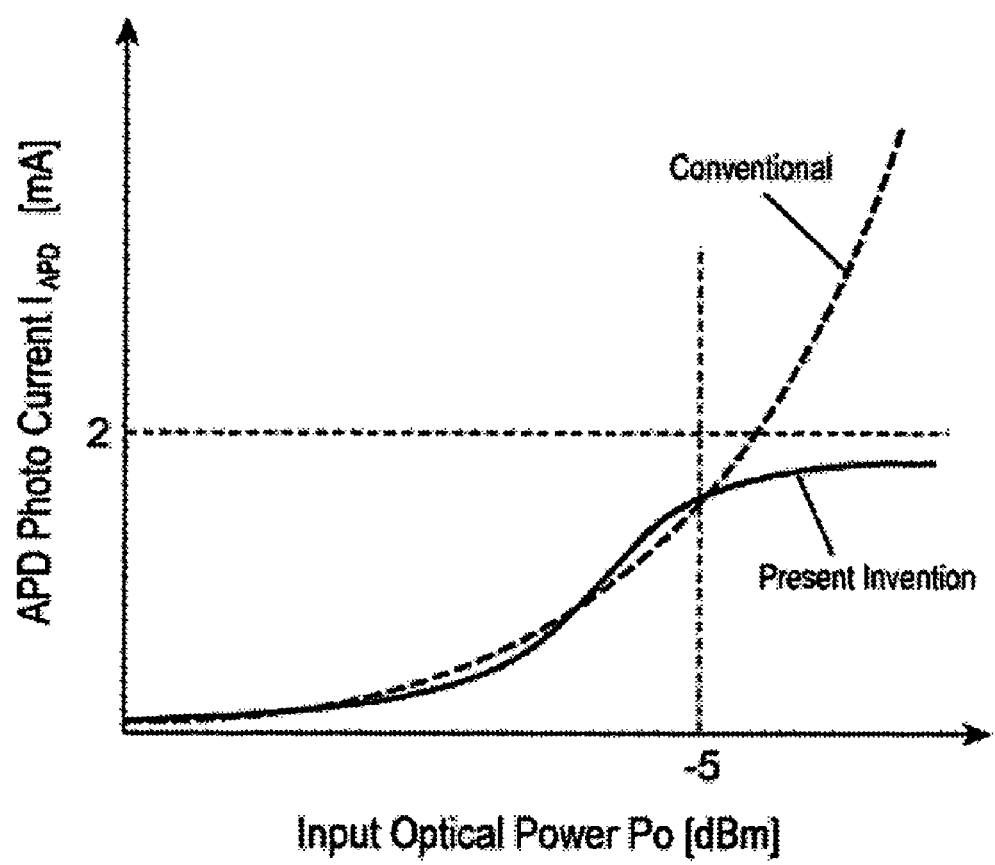
FIG. 6 shows a relation between the optical input power $P_O$ and the photo current of the APD.

FIG. 6 shows a relation between the optical input power $P_O$ and the photo current $I_{APD}$ of the APD 6. Typical APD will break down when the self current exceeds about 2 mA. As shown in a dotted line, the optical receiver 1 of the present invention, when the optical input power $P_O$ increase exceeding the preset value $P_{MAX}$, for example in the region greater than −5 dBm, gradually decreases the output voltage $V_{SET}$ to suppress the increase of the photo current $I_{APD}$. On the other hand, in the conventional optical receiver, which is shown as a broken line in the figure and maintains the bias voltage to the APD constant, the photo current $I_{APD}$ rapidly increases as the increase of the optical power $P_O$, which shows a possibility to break the APD by the current generated by the APD.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the appended claims and their equivalents. For example, the controller 11 evaluates the optical input power $P_O$ based on the LUT stored in the memory. However, the optical input power may be estimated by using an approximation based on combinations of the monitored current $I_{MON}$ and the output voltage $V_{SET}$.

What is claimed is:

1. A method for controlling a bias voltage to an avalanche photodiode that generates a photo current corresponding to an optical input power incident to the avalanche photodiode, the method comprising steps of:

detecting the photo current, estimating the optical input power based on the detected photo current and the bias voltage applied to the avalanche photodiode, comparing the estimated optical input power with a preset power, calculating, when the estimated input optical power exceeds the preset power, a revised bias voltage based on a difference between the estimated optical input power and the optical input power in the last iteration, adjusting the bias voltage based on the calculation of the revised bias voltage, and iterating steps of the detection, the estimation, comparison and the calculation, wherein the revised bias voltage is changed from the bias voltage in the last iteration by the difference between the estimated input optical power and the input optical power in the last iteration multiplied by a constant.

2. The method according to claim 1, wherein the estimation of the optical input power is carried out by using the detected photo current and the bias voltage adjusted in the last iteration.

* * * * *